United States Patent [19]

Eckel et al.

[11] Patent Number: 4,761,020

[45] Date of Patent: Aug. 2, 1988

[54] AIR SUSPENSION SYSTEM

[75] Inventors: Hans G. Eckel, Hirschberg; Willi Schweikert, Heidelberg, both of Fed. Rep. of Germany

[73] Assignee: Firma Carl Freudenberg, Weinheim/Bergstrasse, Fed. Rep. of Germany

[21] Appl. No.: 31,424

[22] Filed: Mar. 30, 1987

[30] Foreign Application Priority Data

Jul. 1, 1986 [DE] Fed. Rep. of Germany ....... 3622017

[51] Int. Cl.$^4$ ..................... B60G 11/26; F16F 15/04
[52] U.S. Cl. .................................. 280/714; 280/6 R; 280/711; 280/DIG. 1
[58] Field of Search .......... 280/6 R, 711, 714, DIG. 1

[56] References Cited

U.S. PATENT DOCUMENTS

| 3,121,573 | 2/1964 | Alfieri et al. | 280/DIG. 1 |
| 3,166,340 | 1/1965 | Rusconi | 280/DIG. 1 |
| 3,194,579 | 7/1965 | Peras | 280/DIG. 1 |
| 3,214,188 | 10/1965 | Alfieri | 280/DIG. 1 |
| 3,778,081 | 12/1973 | Takahashi et al. | 280/714 |
| 4,377,299 | 3/1983 | Fujii | 280/714 |

Primary Examiner—Kenneth R. Rice
Attorney, Agent, or Firm—Felfe & Lynch

[57] ABSTRACT

An air spring, for suspension of a vibrating body on a base, comprising a bellows with an air-filled interior which can be connected as needed by a control valve to a compressed-gas reservoir or to the atmosphere. The control valve is actuated by a piston whose front face is acted upon by the internal pressure of the air spring bellows and whose rear face is acted upon by a gas cushion of variable pressure contained in a pressure chamber, and which produces a compensation of vibration-caused pressure changes in the bellows by feeding additional compressed air in or letting compressed air out. The pressure chamber is provided with a signal-operated inlet valve and a signal-operated outlet valve, and these valves are electrically connected to the signal transmitter of a displacement detector.

8 Claims, 1 Drawing Sheet

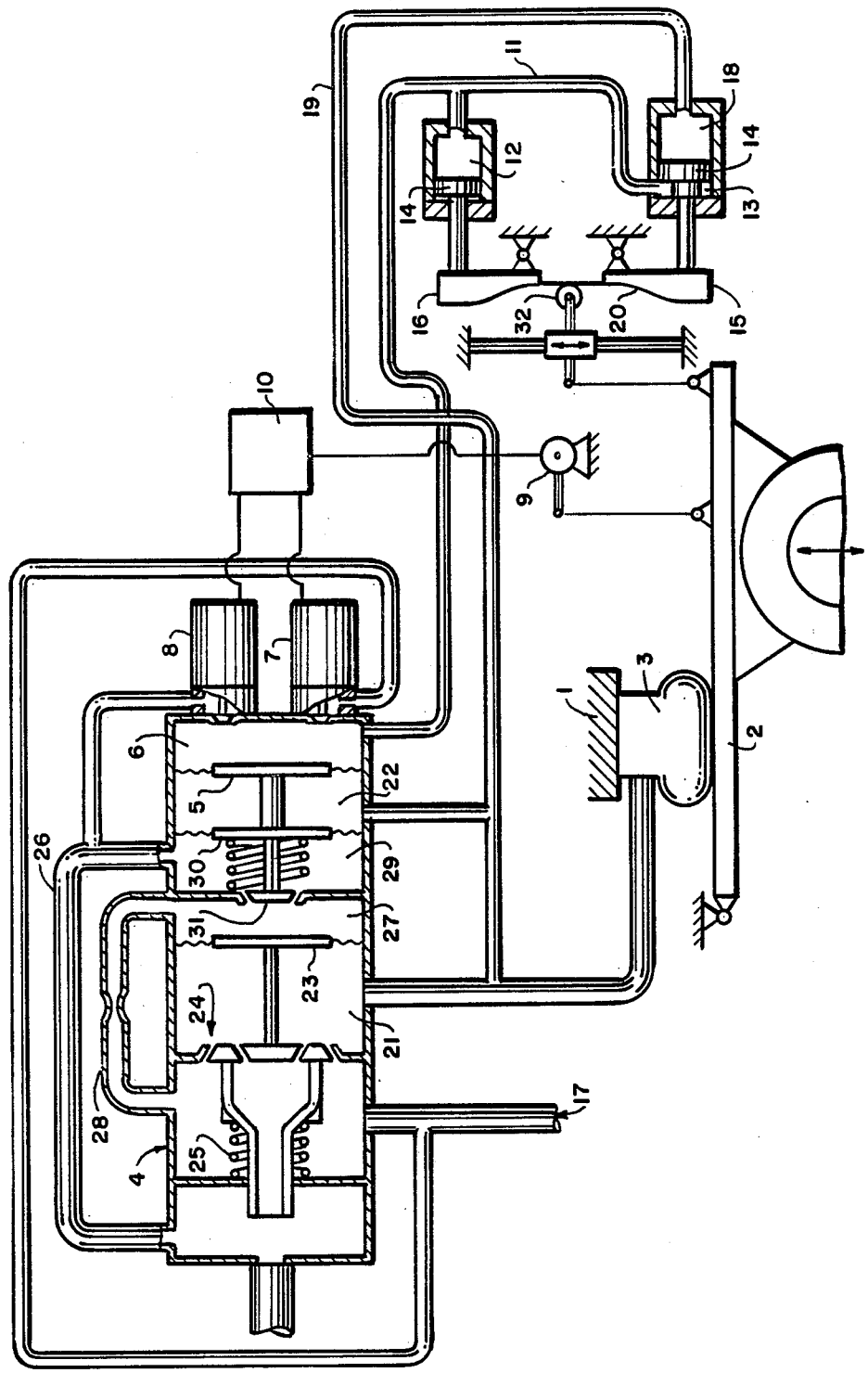

AIR SUSPENSION SYSTEM

BACKGROUND OF THE INVENTION

The invention relates to an air actuated system for suspension of a vibrating body on a base, including an air spring, such as a bellows with an air-filled interior, which can be connected by a control valve, as needed, to a compressed gas tank or to the atmosphere. The control valve is operated by an actuating piston whose front face is acted upon by the internal pressure of the bellows and whose back face is acted upon by a variable-characteristic adjusting spring and brings about a compensation of vibration-caused pressure changes in the bellows by allowing additional air in or letting previously compressed air out.

An air spring of the type described above is disclosed in the German published patent application (DE-OS) No. 3,434,658. With this system, return of the vibrating body to its original mid-position is still not very satisfactory, depending upon how the bellows is constructed.

It is an object of the present invention to improve an air spring of the type described above such that, regardless of the configuration of the bellows and the marginal conditions of utilization, an improved return of the vibrating body to its middle position will be assured.

SUMMARY OF THE INVENTION

This object, as well as other objects which will become apparent in the discussion that follows, are achieved in an air spring of this kind, in that (1) a pressure chamber is provided on one side of the actuating piston and the adjusting spring is formed by a gas cushion contained in this pressure chamber; (2) the pressure chamber is connected by a signal-actuated inlet valve to the compressed gas reservoir and by a signal-actuated outlet valve to the atmosphere; and (3) a displacement detector is provided with a signal generator to detect the relative displacements of the body, and this signal generator is connected to the inlet valve and the outlet valve in order to prevent the body from leaving the central position.

The basic function of the control valve, which is to compensate the pressure changes in the bellows resulting from the vibrations, is thus augmented, according to the invention, by the raising and lowering of the internal pressure in the bellows upon occurrence of movements of the vibrating body away from its central position. In order to prevent the impairment of one function by the other, it has been found to be advantageous for the signal transmitter to include a frequency filter through which only low-frequency vibrations can pass. The average pressure in the pressure chamber of the pressure control thus undergoes a change only when a deviation from the central position between the base and the body lasts for a relatively long time. For applications in machine construction, frequency filters which pass only frequencies below 1 Hertz have generally proven useful.

The pressure chamber of the control valve can be connected by a line to a reservoir and to a vacuum chamber, while the reservoir and vacuum chamber are defined each by a buffer wall, these two buffer walls forming end stops for the vibrating body and being movable by the latter against spring bias by the production of an overpressure or vacuum in the line, and the buffer wall of the reservoir forming the top end stop and the buffer wall of the vacuum chamber forming the bottom end stop of the body. The term, "top end stop," in connection with the present invention, is to be understood to refer always to the end stop which is contacted when the bellows is at its minimum expansion, and the term, "bottom end stop," refers to the one which is contacted when the bellows is at is maximum expansion. Extreme movements of the vibrating body, which in actual practice often are of only extremely short duration, can be counteracted very effectively by this configuration and an extremely fast return of the vibrating body to its central position can be achieved.

The principle of operation that is applied consists in overproportionally increasing the normal speed of response of the pressure control during the length of time the end stops are contacted, by a corresponding increase or decrease of the pressure in the pressure chamber and thereby momentarily simulating the state of an increase or reduction of the static load to be borne by the air spring. The basic regulating action is not changed by this, and after leaving the end stop in question the original speed of response is restored.

After leaving the end stops, the buffer walls must be returned to their initial position, which may be effected by the use of spring elements or of a separate drive. It has proven to be especially advantageous if, for the attainment of this purpose, the buffer wall of the vacuum chamber is formed by a piston of a piston-and-cylinder unit and is separated by the latter from a spring chamber, the spring chamber being connected by a control line to the interior of the bellows. The pressures in the pressure chamber and the second control chamber differ but slightly and correspond to those in the vacuum chamber and spring chamber. However, the piston face area of the buffer wall defining the vacuum chamber is reduced in comparison to the piston area defining the spring chamber, by the cross section of the piston stem. When the end stop is not actuated, therefore, the above-mentioned piston is always in its starting position. Such a configuration is unnecessary in the case of a reservoir. Such a reservoir is connected by a line to the pressure chamber and is thus always exposed to an elevated pressure, causing the buffer wall defining the reservoir to be always in its starting position when the end stop is not actuated.

For the achievement of an especially fast response it has been found advantageous for the pressure chamber to have a volume which is smaller than the volume of the reservoir or the vacuum chamber. The difference is preferably as large as possible. Even in the case of a configuration in which the pressure chamber has a volume which is no more than half as great as the volume of the reservoir or of the vacuum chamber, a decidedly faster response is achieved. It is definitely greater than that which can be achieved by the use of electrically operated valves. Stretching of the line between the vacuum chamber and the reservoir is just as disadvantageous as an excessively large volume in the line. Both are to be avoided.

The end stops producing a pressure increase and pressure decrease in the pressure chamber of the control valve should not be contacted only when extreme deflections of the vibrating body occur, but even before, on a greater length, so as to avoid the occurrence of extreme vibratory excursions of the body. From this point of view it has been found advantageous for the end stops to be provided with ramps. These can, if desired, have a progressively increasing angle of inclination in order thus to achieve a progressive increase in the speed of response of the control valve upon the occurrence of extreme vibratory excursions.

The foregoing as well as other objects, features and advantages of the present invention will be apparent from the following, more particular description of the preferred embodiments of the invention, as illustrated in the accompanying drawing.

BRIEF DESCRIPTION OF THE DRAWING

The single Figure is a schematic diagram of an air-actuated system for suspension of a vibrating body on a base comprising both an air spring and a control valve according to the present invention.

DESCRIPTION OF A PREFERRED EMBODIMENTS

The embodiment illustrated in the Figure relates to the resilient suspension of a vehicle frame on the axle assembly of a motor vehicle. Therefore, in the nomenclature used herein, the axle assembly forms the base 2 and the vehicle frame forms the body 1.

Other applications, such as the resilient suspension of a driver's seat or cab, for example, are also possible. The bellows forming the spring is usually in the form of a bolster, but it can also be replaced by a piston-and-cylinder unit.

The bellows 3 disposed between the base 2 and body 1 is connected by a control line 19, through which fluid can flow in both directions, both to a first control chamber 21 and to a second control chamber 22 of a regulating valve 4, as well as to the spring chamber 18 of a bottom end stop 15. The first chamber 21 is defined on the one side by an auxiliary piston 23 which is sealed off by a diaphragm against the surrounding wall of the regulating valve 4. On the opposite side, the first control chamber 21 is defined by a working valve 24. The latter contains a combined inlet-outlet valve whose conical valve bodies are biased against their seat in the one case by a compression spring 25 and in the other by a stem of the auxiliary piston 23.

An inlet valve 7 is fed with compressed air by the pressure from a compressed gas reservoir 17, and an outlet valve 8 is connected to the atmosphere through a vent line 26 that bypasses the conical valve body of the working valve 24 on the outlet side.

The auxiliary piston 23 defines a third control chamber 27 on the side opposite to the first control chamber 21. This third control chamber 27 is connected through a throttling line 28 to the compressed gas reservoir 17. Gas at an elevated pressure is thus fed constantly into this third control chamber 27. The resultant pressure in the chamber 27 bears against a conical valve body of a venting valve 31 which is connected through the fourth control chamber 29 to the venting line 26.

The conical valve body of the venting valve 31 is rigidly affixed to a control piston 30 to a piston 5. The valve body is held on its seat by a spring and has a smaller pneumatically active surface area than the piston 5. The control piston 30 and the piston 5 are sealed against the wall of the control valve 4 by annular diaphragms and thus define both sides of a second control chamber 22. The piston 5 defines the pressure chamber 6 on its side opposite to the second control chamber 22. This pressure chamber is connected by a line 11 to a vacuum chamber 13 for the bottom end stop 15, and to a reservoir 12 for the upper end stop 16.

The inlet valve 7 and the outlet valve 8, which are connected, respectively, with the compressed gas source 17 and with the venting line 26, open into the pressure chamber 6. These valves 7 and 8 are operated electrically by a signal generator 10 which is electroconductively connected to a displacement detector 9 and receives from the latter an input signal that is directly proportional to the relative position of the body 1 with reference to the base 2.

The body 1 is provided with the end stops 15, 16, which, in the event of extreme relative displacements of the base 2, are pivoted toward the right out of the represented position by a wheel 32 connected with the base 2, to produce a displacement of the buffer wall 14 of the vacuum chamber 13 or the buffer wall 14 of the reservoir 12. This displacement takes place to an increasing extent by means of progressively rising ramps 20 according to the actual degree of the relative displacement between the body 1 and base 2.

The operation of the suspension system shown in the Figure is as follows:

In the starting position the system is assumed to be completely empty of compressed gas.

The displacement detector 9 signals to the signal transmitter 10 a permanent relative upward displacement of the base 2 and produces a flow of compressed gas through the inlet valve 7 into the pressure chamber 6. The pressure rise that results in this chamber produces a leftward movement of the piston 5 thereby closing the vent valve 31. The gas that continues to be fed through the throttle line 28 thus cannot escape and produces a pressure rise in the third control chamber 27. This acts on the auxiliary piston 23, which moves leftward and unseats the conical body of the working valve 24 on the inlet side. The air fed from the compressed gas reservoir 17 can thus flow into the bellows 3.

As the pressure increase in the bellows 3 continues, the result is a progressive movement of the vehicle body 1 away from the base 2. The displacement detector 9, upon reaching a middle position, signals the signal generator 10 to close the inlet valve 7, thereby preventing the continued flow of compressed gas into the pressure chamber 6. High inflow velocities into the pressure chamber 6 can cause the middle position to be momentarily exceeded: a situation which is tolerable in some cases but undesirable in others. The inflow velocity is to be lowered in such cases, and this can be done by reducing the inflow cross section or by the controlled injection of small amounts of air. The gradual pressure increase in the pressure chamber 6 to a level corresponding to the load to be carried finally results in an equilibrium of forces at the piston 5, upon which the vent valve 31 is opened and the pressure in the third control chamber 27 is lowered. The auxiliary piston 23 is moved relatively rightward, thereby closing the inlet part of the working valve 24 and thus stopping any further inflow of compressed gas into the bellows 3.

Upon the occurrence of a vibratory relative movement between the body 1 and the base 2, a pulsating pressure variation takes place in the first control chamber 21. This results in a corresponding pulsating movement of the auxiliary piston 23, which causes an actuation of the working valve 24, thus compensating the pressure variation.

If the load that is to be carried increases, the displacement detector 9, through the signal generator 10, causes additional compressed gas to be fed into the pressure chamber 6. The venting valve 31 is thereby momentarily closed, resulting in a pressure rise in the bellows 3. Further feeding of compressed air into the bellows 3 is stopped when the equilibrium of forces on the piston 5 is again reached.

If the load that is to be carried diminishes, the displacement detector 9 produces through the signal generator 10 a reduction of the pressure in the pressure chamber 6. The venting valve 31 is thereby opened, resulting in a pressure drop in the third control chamber 27.

The result is a rightward movement of the auxiliary piston 23, which causes in the opening of the outlet valve contained in the working valve 24, and hence a lowering of the pressure contained in the bellows 3. This continues until equilibrium is again present at the piston 5.

Upon the occurrence of an extreme deflection of the base 2 with respect to the body 1, the result is a rightward displacement of the upper end stop 16 by the roller 32.

The volume of compressed gas contained in the reservoir 12 is thus spontaneously displaced into the pressure chamber 6, resulting in a pressure increase and hence in a closing of the venting valve 31 and, as a consequence, in an opening of the inlet part of the working valve 24. The pressure in the bellows 3 is thereby spontaneously increased and produces a downward relative movement of the base 2 and with it an increasing distance away from the upper end stop 16.

After the end stop 16 is unloaded, the pressure still prevailing in the working chamber 6 effects a return of the piston constituting the buffer wall 14 of the reservoir 12.

In the case of an extreme movement of body 1 away from the base 2, there will be an actuation of the lower end stop 15 by the roller 32 and, as a result, a rightward displacement of the piston constituting the buffer wall 14 of the vacuum chamber 13. This produces a spontaneous lowering of pressure in the pressure chamber 6 and, consequently, a rightward movement of the piston 5. The venting valve 31 is thereby opened and produces a reduction of the pressure in the third control chamber 27 and, as a result, a rightward movement of the auxiliary piston 23 and hence an opening of the outlet part of the working valve 24.

This operation causes a spontaneous lowering of pressure in the bellows 3 which, in turn, causes a reversal of direction of the relative movement between the body 1 and the base 2. This operation continues as long as the lower end stop 15 is still in operation. After that the normal regulation is restored and the buffer wall 14 is moved back to its starting position by the pressure in the reservoir 12, which is the same as the pressure in the pressure chamber 6.

There has thus been shown and described a novel air suspension system which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. An air actuated system for suspension of a vibrating body on a base comprising, in combination:
    (a) an air spring with an air filled interior and mechanically coupled between said body and said base;
    (b) control valve means for selectively connecting said air spring to a compressed air reservoir or to the atmosphere, said control valve means including:
        (1) a control valve, selectively connecting said interior of said air spring to said compressed air reservoir or to said atmosphere;
        (2) a movable control piston having front and rear surfaces, said piston being acted upon on its front surface by an internal pressure of said air spring and on its rear surface by an adjusting pressure, said control piston being connected to actuate said control valve so as to compensate vibration-caused pressure variations in said air spring by the additional infeed or the blow off of compressed air, respectively, to and from said interior of said air spring;
        (3) a pressure chamber arranged to apply said adjusting pressure against said rear surface of said movable piston;
        (4) a signal responsive inlet valve selectively connecting said pressure chamber to the compressed air reservoir;
        (5) a signal responsive outlet valve selectively connecting said pressure chamber to the atmosphere;
    (c) means, connected to said inlet valve and said outlet valve, for determining the relative displacement of said body and said base and producing a signal representing said relative displacement;
    wherein said signal is applied to said inlet valve and said outlet valve in order to prevent a slow deplacement of said body from the middle position with respect to said base.

2. The air suspension system according to claim 1, wherein said pressure chamber is connected by a line to a reservoir and to a vacuum chamber, wherein said reservoir and said vacuum chamber are each defined, in part, by a buffer wall, wherein said buffer walls form end stops for said body and can be moved against spring force by said body for the production of an overpressure or partial vacuum in the line, and wherein the buffer wall of said reservoir forms the top end stop and the buffer wall of said vacuum chamber forms the bottom end stop of said body.

3. An air actuated system for suspension of a vibrating body on a base comprising, in combination:
    (a) an air spring with an air filled interior and mechanically coupled between said body and said base;
    (b) a control valve for selectively connecting said air spring to a compressed air reservoir or to the atmosphere, said control valve including:
        (1) a movable control piston having front and rear surfaces, said piston being acted upon on its front surface by the internal pressure of said air spring and on its rear surface by an adjusting pressure, said control piston being connected to actuate the control valve so as to compensate vibration-caused pressure variation in said air spring by the additional infeed or the blow-off of compressed air;

(2) a pressure chamber arranged to apply said adjusting pressure against said rear surface of said movable piston;
(3) a signal responsive inlet valve selectively connecting said pressure chamber to the compressed air reservoir;
(4) a signal responsive outlet valve selectively connecting said pressure chamber to the atmosphere;
(c) means, connected to said inlet valve and said outlet valve, for determining the relative displacement of said body and said base and producing a signal representing said relative displacement;
wherein said signal is applied to said inlet valve and said outlet valve in order to prevent a slow displacement of said body from the middle position with respect to said base; wherein said pressure chamber is connected by a line to a reservoir and to a vacuum chamber; wherein said reservoir and said vacuum chamber are each defined, in part, by a buffer wall; wherein said buffer walls form end stops for said body and can be moved against spring force by said body for the production of an overpressure or partial vacuum in the line; and wherein the buffer wall of said reservoir forms the top end stop and the buffer wall of said vacuum chamber forms the bottom end stop of said body.

4. The air suspension system according to claim 3, wherein said pressure chamber has a volume which is smaller than the volume of said reservoir or of said vacuum chamber.

5. The air suspension system according to claim 4, wherein said pressure chamber has a volume that is no more than half as great as the volume of said reservoir or of said vacuum chamber.

6. The air suspension system according to claim 3, wherein said end stops are provided with ramps.

7. The air suspension system according to claim 6, wherein said ramps have a progressively increasingly angle of inclination.

8. The air suspension system according to claim 3, wherein said buffer wall of said vacuum chamber is formed by a piston of a piston-and-cylinder unit and is separated by said piston from a spring chamber, and wherein said spring chamber is connected by a control line to the interior of said air spring.

* * * * *